April 27, 1926.　　　　　　　　　　　　　　　1,582,882
S. OTTO ET AL
EVAPORATOR FOR REFRIGERATING APPARATUS
Filed Dec. 19, 1924　　　2 Sheets-Sheet 2

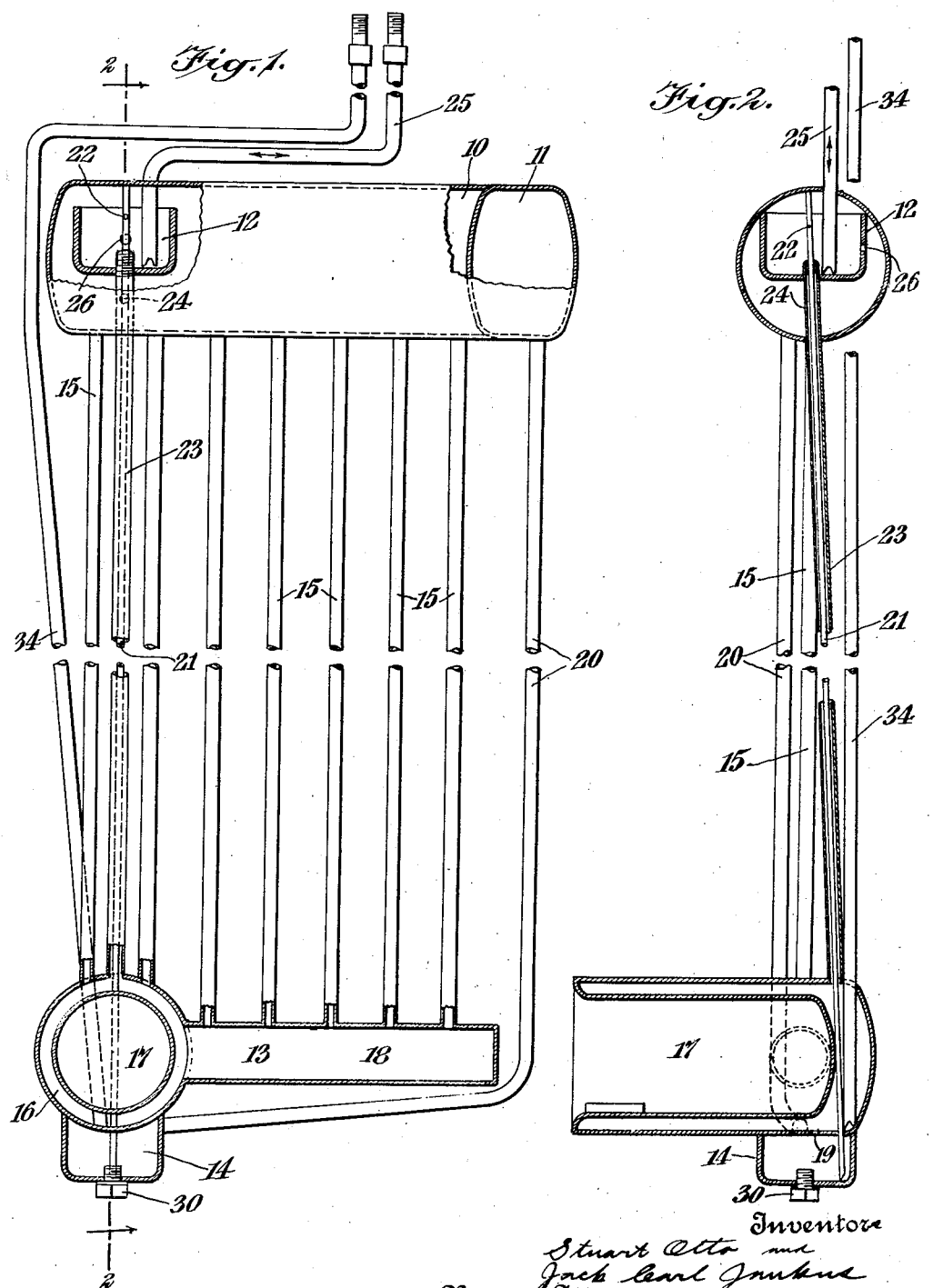

INVENTORS
Stuart Otto
Jack Carl Jenkins
BY
Dean, Fairbank, Obright & Hirsc
ATTORNEYS Patented Apr. 27, 1926.

1,582,882

UNITED STATES PATENT OFFICE.

STUART OTTO AND JACK CARL JANKUS, OF SCRANTON, PENNSYLVANIA, ASSIGNORS TO ICELESS AUTOMATIC REFRIGERATOR COMPANY, OF DOVER, DELAWARE, A CORPORATION OF DELAWARE.

EVAPORATOR FOR REFRIGERATING APPARATUS.

Application filed December 19, 1924. Serial No. 756,880.

*To all whom it may concern:*

Be it known that we, STUART OTTO and JACK CARL JANKUS, both citizens of the United States, and residents of Scranton, in the county of Lackawanna and State of Pennsylvania, have invented certain new and useful Improvements in Evaporators for Refrigerating Apparatus, of which the following is a specification.

This invention is an improvement in refrigerators for liquefied refrigerant, and adapted for use as the cooling element in a refrigerator or other chamber to be kept at a sub-atmospheric temperature.

In refrigerating systems of the absorption type in which ammonia is alternately absorbed in and driven off from the water, the heating of the water or strong liquor to drive off the ammonia, vaporizes some of the water and it is difficult to secure a sharp line of fractional condensation to effect the return of all of the condensed water vapor to the still and the delivery of all of the condensed ammonia to the evaporator. If the precondenser or dephlegmator temperature be low enough to condense and return all of the water vapor, it may condense and return some of the ammonia to the still, which is uneconomical. If no ammonia be condensed in the precondenser, some water vapor may pass over to the main condenser and thence to the evaporator.

As the temperature of the evaporator is normally kept near or below the freezing point of water, very little if any water passing over to the evaporator will be evaporated therein and returned to the absorber with the ammonia gas, in normal operation of ordinary constructions.

In large plants in charge of skilled operatives, various satisfactory ways have been devised for effecting the return of water or liquor from the evaporator to the absorber, but these are not readily adaptable for use in small household plants for cooling refrigerators, due to the lack of necessary technical training on the part of the owner or servants in charge. The slow and gradual accumulation of water in the evaporator will slowly reduce the efficiency of the apparatus to the point where it becomes very uneconomical or even inoperative.

This invention relates to that type of construction in which the heating and cooling periods occur alternately and preferably of that type in which the evaporator serves as a receiver for the liquefied refrigerant during the heating period. The construction illustrated in this application is an improvement on the constructions illustrated and more broadly claimed in our copending application Serial No. 613,442, filed January 18, 1923.

The main object of our invention is to effect the automatic return from the evaporator or receiver to the absorber, after the heating period, of any not readily vaporizable liquid delivered to the evaporator or receiver during the heating period.

A further object is to secure this result without the use of valves or any moving parts, and by simple, inexpensive construction, easy to assemble, certain in operation, and not requiring any attention or manipulation on the part of the user.

As one important feature of our construction we employ a trap or sump at the lowermost part of the receiver, and connect this to a pressure chamber and to the return conduit. Any water passing over during the heating period will collect in the sump, and liquid not vaporized during the cooling period will drain to the sump. The reduction in pressure in the evaporator at the beginning of each cooling period is accompanied by a corresponding reduction in the pressure chamber, and this forces liquid from the sump to a point where it is received by the suction pipe and returned to the absorber. This operation takes place during each cycle and therefore no objectionable amount of water can accumulate in the evaporator and no manual operation of parts or expert supervision is necessary.

In the accompanying drawings we have illustrated one embodiment of our invention which has proved satisfactory in use.

In these drawings:

Fig. 1 is a side elevation, certain of the parts being shown in section.

Fig. 2 is a sectional detail on the line 2—2 of Fig. 1.

Figure 3:
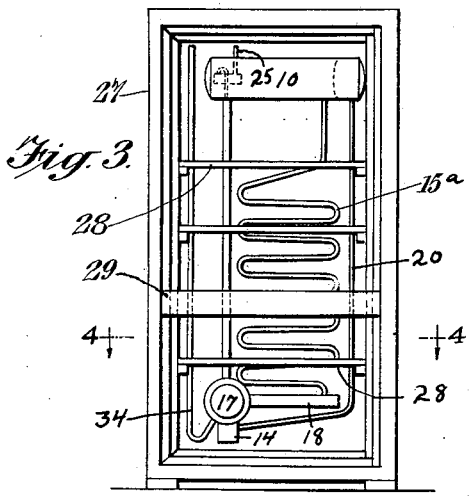
Fig. 3 is a small scale view showing the evaporator installed in a refrigerator.

In the evaporator as illustrated, there is employed an upper part including three compartments, or chambers, 10, 11 and 12, and a lower part including a pair of chambers or compartments 13 and 14. In the upper part, the compartment 10 is the main compartment and is shown in the form of a horizontally disposed sheet metal drum. The compartment 11 is an auxiliary or pressure compartment and is not in direct communication with the main compartment 10. It may be formed as a part of the drum and separated therefrom by a transverse partition, or the auxiliary chamber may be formed as a separate vessel welded to the body of the drum to form a closure for the end of the latter. The compartment 12 is in the form of a cup within the main compartment 10, although it may be of any other desired form or construction so long as it is in open communication at its upper end with the upper part of the main compartment. It is also desirable that it have its bottom above the bottom of the main compartment.

The main upper compartment 10 is connected to the main lower compartment 13 by a series of vertically disposed pipes 15 which open at their upper and lower ends into these two compartments. The lower compartment 13 may be of any desired form, that illustrated including an annular section 16 encircling a compartment 17 open at one end and into which articles may be placed for freezing. The lower compartment 13 also includes a laterally projecting tubular member 18 at right angles to the annular section and to which most of the pipes 15 are connected. The lower compartment 14 constitutes a sump or drainage chamber from the main lower compartment 13 and is connected thereto by a small drainage opening 19. The pressure chamber 11 is connected to the sump by a conduit 20 and a small tube 21 extends from the lowermost portion of the sump through the lower main compartment 13 to the upper part of the cup 12. The tube may terminate anywhere within this cup, but for economy in manufacture the tube preferably has its upper end abutting against the upper side of the main compartment 10 and is provided with a port 22 within the cup. The main body of the tube 21 between the chambers 13 and 10 is enclosed in a larger tube 23 which opens at its lower end into the lower main compartment, and at its upper end into the upper main compartment. This tube 23 is shown as serving as the support for the cup 12 and is closed at its upper end so as to not directly communicate with the interior of the latter. It is provided with a port 24 in the main compartment below the cup. The upper end may be threaded into the bottom of the cup and may be closed by a plug through which the tube 21 extends. The evaporator may be used in a system in which a single pipe serves for delivering liquefied ammonia to the evaporator during the heating period and returns vaporized ammonia from the evaporator during the cooling period. Such a single pipe 25 is shown as extending through the upper wall of the compartment 10 and terminating adjacent to the bottom and inside of the cup.

The operation of the apparatus constructed as above described is as follows: During the heating period the liquefied ammonia is delivered through the pipe 25 to the cup 12, and may overflow therefrom or flow out through a port 26 into the main compartment and fill the entire evaporator to the desired level. Any water delivered with the ammonia gas will settle to the bottom and through the port 19 into the sump 14. As the level rises in the evaporator, liquid will flow up through the conduit 20 to maintain the same pressure in the compartment 11 as in the compartment 10. At the end of the heating period the apparatus is operated to effect a material drop in pressure, whereby the liquefied ammonia in the evaporator may evaporate and return through the pipe 25. As soon as this drop in pressure occurs and the suction begins in the pipe 25, what little liquid there is in the cup 12 will be drawn back through the pipe 25 to the absorber. At the same time the drop in pressure in the system will cause an expansion of the gas in the upper part of the compartment 11, and this will cause a pressure in the sump which will tend to force out the contents of the latter. It will be noted that the conduit 20 is very much larger than either the conduit 21 or the port 19. After the heat is turned off and the cooling water is turned on at the boiler-absorber, the drop in pressure is comparatively rapid. It may drop from 150 pounds to 30 pounds in a few minutes. The pressure exerted on the liquid in the sump 14 by the expansion of the gas in the pressure chamber 11 at the time of the rapid drop in pressure causes liquid to be forced out of the sump through both the tube 21 and liquid or gas through the small port 19. That portion of the liquid which is forced up through the tube 21 will be delivered to the cup from which it will be sucked back to the absorber by the pipe 25. As soon as the pressures have equalized this delivery through the tube 21 will cease and therefore only a small amount of liquid will be delivered from the sump to the cup during each cycle. As soon as the pipe 25 has sucked out the liquor initially in the cup 12 and has sucked out such liquid as is delivered thereto from the sump 14, it will then withdraw gas from the upper part of the main chamber 10 and the normal operation of cooling by evaporation will proceed to the end of this portion of the cycle. In such normal operation there may be boiling in the tubes 15. It is undesirable that there be any boiling in the tube 21 as that would result in the delivery of further liquid to the cup and the sucking of such liquid back to the absorber without its having been evaporated to produce the desired cooling effect. For that reason the tube 21 is enclosed in the tube 23 so that any boiling of the ammonia in the tube 23 will deliver liquid therein to the main compartment 10 below the cup, and at the same time will keep the tube 21 below the boiling temperature and prevent any upflow in this tube.

Figure 4:
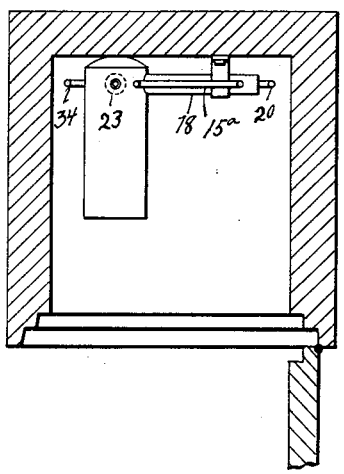
Fig. 4 is a transverse section on the line 4—4 of Fig. 3.

In Figs. 3 and 4 there is illustrated a refrigerator construction in which the evaporator shown in Figs. 1 and 2 may be employed. It will be noted that the main compartment 10 and the tube 18 may lie against the rear wall of the refrigerator, while the annular part 16 may project forward so that the chamber 17 will open toward the front. The pipes 15 are here shown as replaced by a single zigzag conduit 15ª. The casing 27 is shown as having a plurality of shelves 28 therein, and upper and lower doorways spaced by a transverse member 29.

In the construction of evaporator as shown in Figs. 1 and 2, the port 19 is formed as a hole in the wall between the compartments 13 and 14. Obviously this might be made very much larger than as shown and provided with a closure having an opening of the desired size therethrough, whereby the parts might be more effectively cleaned. The sump is shown as provided with a closure 30 through which the system may be drained, or scale or dirt flushed out after initial assembly.

Figure 5:
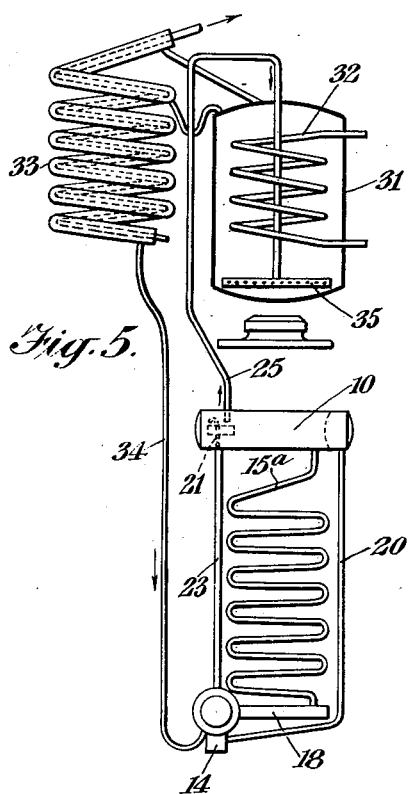
Figs. 5 and 6 are somewhat diagrammatic views showing a refrigerating system of which the evaporator may form a part.
Figure 6:
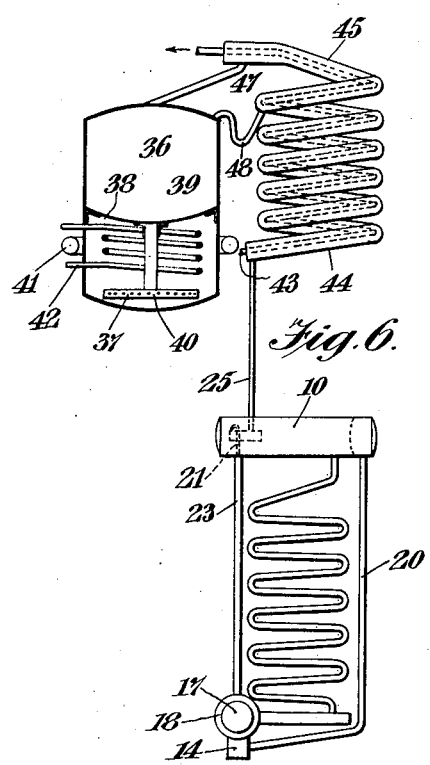

Our improved evaporator may be used in a system in which there is a single supply and return conduit or separate supply and return conduits. In Fig. 5 there is diagrammatically illustrated a system in which there is a still-absorber 31 having a coil 32 which may be used alternately for heating and cooling. The gas when driven off during the heating period may flow through a condenser 33 and a conduit 34 which may be connected to the bottom of the evaporator as shown in Figs. 1 and 2. The pipe 25 from the upper compartment leads to a distributor 35 at the bottom of the still-absorber. In Fig. 6 there is illustrated a system employing the type of still-absorber shown in our prior Patent 1,470,638, issued October 16, 1923. The upper chamber 36 is separated from the lower chamber 37 by a transverse partition 38 from which a tube 39 depends to the distributor 40. The heating is done by an annular burner 41 and the cooling of the lower chamber 37 by a coil 42. The condenser is shown of the concentric pipe type in which the water flows in the inner pipe 43 and the ammonia in the outer pipe 44. The construction includes a pre-condenser section 45 so arranged that water leaving the still with the ammonia gas through the pipe 46 may condense before reaching the outlet point 47 and may flow back to a pipe 48 and thence to the evaporator.

In some cases it may be desirable to provide means whereby positive pressure may be produced in the evaporator to force liquid back to the absorber, as for instance after the apparatus may have been inverted during shipment and the liquor permitted to flow into the evaporator. For this purpose we may employ the pipe 34 as shown in Figs. 1 and 2, but instead of connecting the upper end thereof to the condenser, as shown in Fig. 5, the condenser may be in the pipe 25, as shown in Fig. 6, and the pipe 34 may connect directly to the pipe 25 at a point above the condenser. A three-way valve may be employed at the connection whereby the pipe 34 is normally closed at its upper end and out of operation, but by turning the valve the pipe 25 below the valve may be closed and the pressure in the evaporator will force all of the liquid therein back through the pipe 34 past the three-way valve to the distributor 35. Such operation is necessary only in case of some unusual condition where the mechanism above described for returning water from the evaporator to the absorber is not adequate.

The pipe 34 may be entirely omitted if desired. It will be noted that the pressure chamber acting through the sump constitutes a means for delivering liquid from the evaporator upon a reduction in pressure in the latter, while the pipe 34 constitutes a means for returning liquid from the evaporator by the producing of a high pressure in the evaporator.

Having thus described our invention, what we claim as new and desire to secure by Letters Patent is:

1. An evaporator for absorption refrigerating systems, including a receiver for the liquefied refrigerant, a sump having restricted communication with the lower part of the receiver, an outlet conduit having an opening in the upper part of the receiver for withdrawing gas from the latter, and means for automatically delivering liquid from said sump to said conduit upon a drop in pressure in said receiver.

2. An evaporator for absorption refrigerating systems, including a receiver having a compartment in open communication with the upper part of said receiver, an outlet leading from said compartment, a sump at the lower part of the receiver, and means for delivering liquid from said sump to said compartment.

3. An evaporator having a receiver for liquid refrigerant, a compartment in open communication with the upper part thereof, a conduit for the delivery of refrigerant to and from said receiver and terminating in said compartment below said open communication, a sump having restricted communication with the lower part of said receiver, a conduit leading from said sump to said compartment, and a pressure chamber in open communication with said sump, whereby upon drop in pressure in said receiver and said pressure chamber, the gas in said pressure chamber will force liquid from said sump through said second mentioned conduit to said compartment, and the suction through said first mentioned conduit will remove said liquid from the receiver.

4. An evaporator for refrigerating systems having alternate heating and cooling periods, including a receiver for the liquefied refrigerant, a cup directly communicating with the upper part of the receiver, a sump having restricted communication with the lower part of said receiver, an outlet conduit leading from said cup, and a conduit leading from said sump to said cup.

5. An evaporator for refrigerating systems having alternate heating and cooling periods, including a receiver for the liquefied refrigerant, a cup directly communicating with the upper part thereof of the receiver, a sump having restricted communication with the lower part of said receiver, an outlet conduit leading from said cup, a conduit leading from said sump to said cup, and means for creating a difference in pressure in the sump and cup to raise liquid through said last mentioned conduit.

6. An evaporator for refrigerating systems having alternate heating and cooling periods, including a receiver for the liquefied refrigerant, a cup having its upper part in open communication with the upper part of said receiver, a sump having restricted communication with the lower part of said receiver, an outlet conduit leading from said cup, a conduit leading from said sump to said cup, and a pressure chamber connected to said sump for raising liquid through said last mentioned conduit.

7. An evaporator having a sump at the lower portion thereof, provided with a restricted inlet opening from the evaporator, a pressure chamber connected to said sump, an outlet conduit from said evaporator, and a conduit leading from said sump for the delivery of liquid to said first mentioned conduit upon rapid expansion of gas in said pressure chamber.

8. An evaporator for refrigerating systems, including a receiver for liquefied refrigerant, comprising an upper compartment, a lower compartment, a plurality of conduits connecting said compartments, a gas outlet conduit and a conduit leading from the lowermost portion of said evaporator to a point adjacent said last mentioned conduit, and extending through one of said plurality of conduits.

9. An evaporator for refrigerating systems including an upper compartment, a cup therein, a lower compartment, a plurality of conduits connecting said compartments and a conduit extending from the lowermost portion of the lower compartment to said cup, and extending through one of said plurality of conduits.

10. An evaporator including an upper compartment, a cup therein, a lower compartment, a plurality of conduits connecting said compartments, and a conduit extending from the lowermost portion of the lower compartment to said cup, and extending through one of said plurality of conduits, a pressure chamber, and means whereby gas in said pressure chamber upon expanding forces liquid up through said last mentioned conduit.

11. An evaporator having an upper part including three compartments comprising a main compartment, an auxiliary compartment and a pressure chamber, the main compartment and auxiliary compartment being in open communication and said pressure chamber being out of direct communication with either of the other two, a lower part including a main compartment and a sump connected thereto by a small passage, a conduit connecting said sump and said pressure chamber, a conduit connecting said main upper compartment and said main lower compartment, a conduit leading from said auxiliary compartment and a conduit leading from the lowermost portion of said sump to said auxiliary compartment.

12. An evaporator for liquefied refrigerant including a receiving chamber, means for delivering liquid from the lower portion thereof upon a reduction in pressure in the evaporator, and independent means for delivering liquid from the lower portion of the evaporator by the action of high pressure in the evaporator.

Signed at Scranton in the county of Lackawanna and State of Pennsylvania this 16 day of December 1924.

STUART OTTO.
JACK CARL JANKUS.